(12) United States Patent
Paczkowski et al.

(10) Patent No.: US 8,320,896 B1
(45) Date of Patent: Nov. 27, 2012

(54) UNIFIED COMMUNICATION ACCESS SYSTEM

(75) Inventors: Lyle Walter Paczkowski, Mission Hills, KS (US); Pallavur Sankaranaraynan, Overland Park, KS (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 386 days.

(21) Appl. No.: 12/699,666

(22) Filed: Feb. 3, 2010

(51) Int. Cl.
*H04M 3/42* (2006.01)

(52) U.S. Cl. ........... 455/417; 455/412.1; 455/466; 455/418; 455/413; 455/414.1; 455/445; 379/202.01; 379/201.11; 379/218.01; 709/228

(58) Field of Classification Search ............ 455/412.1, 455/466, 418, 413, 414.1, 417, 445; 379/202.01, 379/201.11, 218.01; 709/225; 370/352, 370/311

See application file for complete search history.

(56) References Cited

U.S. PATENT DOCUMENTS

| | | | |
|---|---|---|---|
| 5,657,383 | A | 8/1997 | Gerber et al. |
| 6,891,929 | B2 | 5/2005 | Yang et al. |
| 2005/0152507 | A1* | 7/2005 | Yang et al. ............ 379/29.01 |
| 2009/0181702 | A1* | 7/2009 | Vargas et al. ............ 455/466 |
| 2011/0195691 | A9* | 8/2011 | Maguire et al. ........... 455/412.1 |

* cited by examiner

*Primary Examiner* — Ajit Patel
*Assistant Examiner* — Fred Casca

(57) ABSTRACT

Embodiments disclosed herein provide systems and methods that allow a mobile device to fully access unified communication services. In a particular embodiment, a mobile device receives a user input indicating a destination identifier for a call and processes the destination identifier to determine whether the destination identifier is associated with a unified communication service. If no, the mobile device connects the call. If yes, the mobile device generates and transfers a text message indicating that the mobile device is requesting the service to an intermediate communication system in a first carrier network. The intermediate system receives and processes the text message to determine a first portion of the service that is associated with the mobile device. The intermediate system initiates the call to the mobile device to connect the mobile device with a unified communication system via the intermediate system and provides the first portion of the service.

20 Claims, 7 Drawing Sheets

UNIFIED COMMUNICATION ACCESS SYSTEM

TECHNICAL BACKGROUND

Unified communication services allow for the integration of real time communication services, such as voice calling and instant messaging, with non-real time communication services, such as voicemail and short message service (SMS). For example, unified communication services may allow multiple phones to be accessed by a single phone number and have the same voicemail inbox. A unified communication system may provide at least a subset of the services that make up unified communication services.

In some cases, other systems on a communication network, such as an Internet Protocol Multimedia Subsystem (IMS) platform, may be necessary to provide other subsets of unified communication services. Mobile devices that access the unified communication system on the same communication network as the IMS platform may be automatically routed through the IMS platform to the unified communication system. However, mobile devices that are not on the same network as the IMS platform may not be routed through the IMS platform and, thus, may only be provided with the subset of unified communication services provided by the unified communication system.

OVERVIEW

Embodiments disclosed herein provide systems and methods that allow a mobile device to fully access unified communication services from a carrier service provider. In a particular embodiment, a mobile device receives a user input indicating a destination identifier for a call. The mobile device processes the destination identifier to determine whether the destination identifier is associated with a unified communication service. If the destination identifier is not associated with the unified communication service, the mobile device initiates the call to the identified destination. If the destination identifier is associated with the unified communication service, the mobile device generates a text message indicating that the mobile device is requesting the unified communication service and transfers the text message to an intermediate communication system in a first carrier network. The intermediate communication system receives the text message from the mobile device and processes the text message to determine at least a first portion of the unified communication service that is associated with the mobile device. The call is initiated by the intermediate communication system to the mobile device that connects the mobile device to a unified communication system via the intermediate communication system. The intermediate communication system provides the first portion of the unified communication service.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
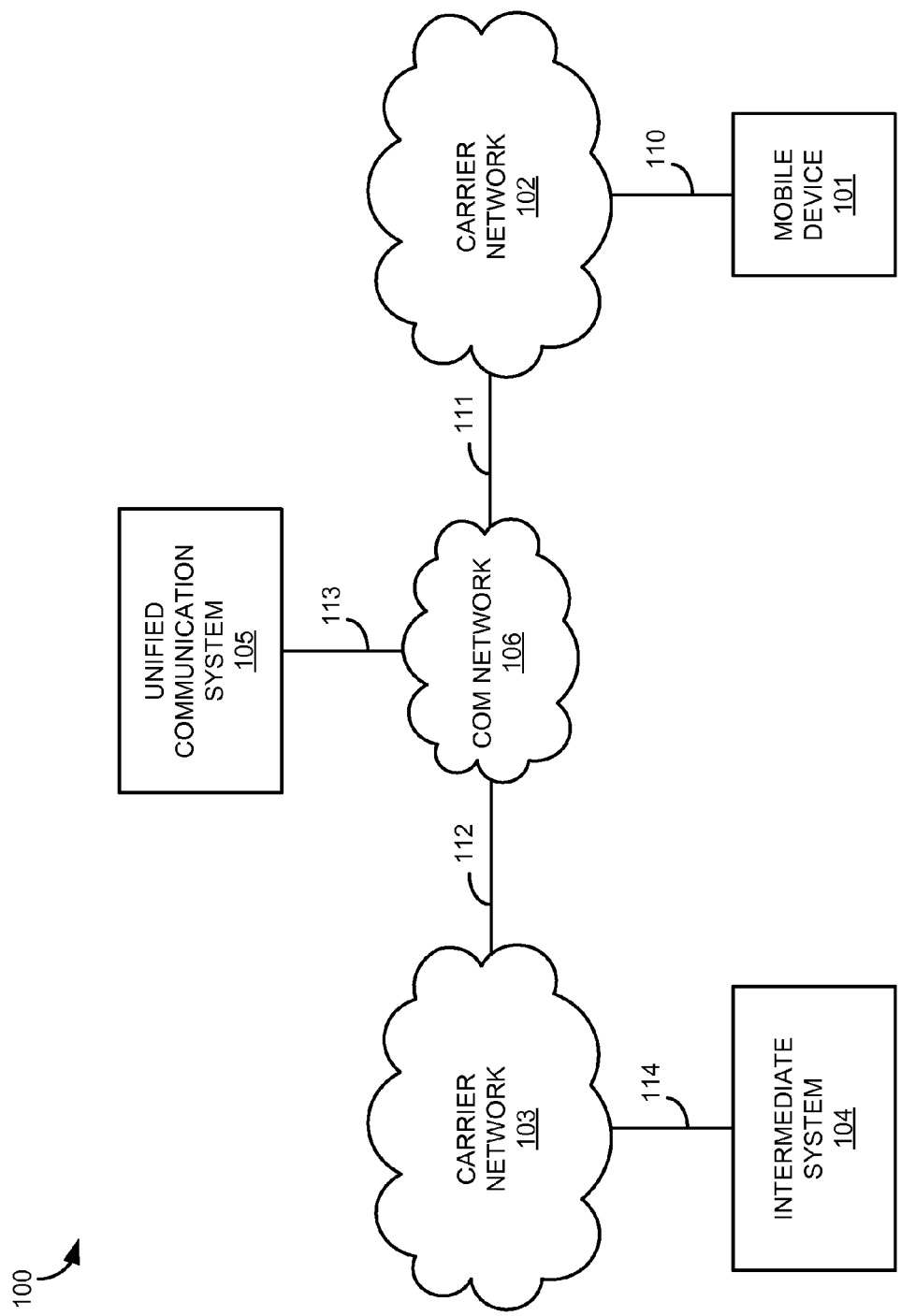
FIG. 1 illustrates a wireless communication system.

FIG. 1 illustrates wireless communication system 100. Wireless communication system 100 includes mobile device 101, carrier network 102, carrier network 103, intermediate communication system 104, unified communication system 105, and communication network 106. Mobile device 101 and carrier network 102 communicate over wireless link 110. Carrier network 102 and communication network 106 communicate over link 111. Communication network 106 and carrier network 103 communicate over link 112. Communication network 106 and unified communication system 104 communicate over link 113. Carrier network 103 and intermediate communication system 104 communicate over link 114.

In operation, communication network 100 is capable of providing unified communication services. Unified communication services allow for the integration of real time communication services, such as voice calling and instant messaging, with non-real time communication services, such as voicemail and short message service (SMS). Unified communication system 105 provides at least a portion of the unified communication services. Intermediate system 104 is a system within carrier network 103 that may provide, or enable, another portion of the unified communication service, such as SMS, trigger detection, or the like. Therefore, a call request for a unified communication service must go through both intermediate system 104 and unified communication system 105 in order to access all portions of the unified communication service.

A mobile device, such as mobile device 101 will only be provided with the portion of the unified communication service that is provided by intermediate communication system 104 if mobile device 101 is associated with the unified communication service. Mobile device 101 may be associated with the unified communication service if it belongs to, or is supplied by, a customer of the unified communication service or has otherwise been given the permissions necessary to access the unified communication service. The permissions necessary to access the unified communication service may be provided by the user, possibly in the form of an identification code entered into mobile device 101.

If mobile device 101 is associated with the unified communication service and requests access to a unified communication service from within carrier network 103, then the request will be sent through intermediate system 104 before being routed to unified communication system 105. Mobile device 101 will then be capable of accessing all portions of the unified communication service to which mobile device 101 is entitled. However, if mobile device 101 is associated with the unified communication service and requests access to a unified communication service from within carrier network 102, then the request may not be routed through intermediate system 104 before being routed to unified communication system 105. In that case mobile device 101 will only be able to access the first portion of the unified communication service that is provided by unified communication system 105, but not the second portion of the unified communication service that is provided by intermediate system 104.

Figure 2:
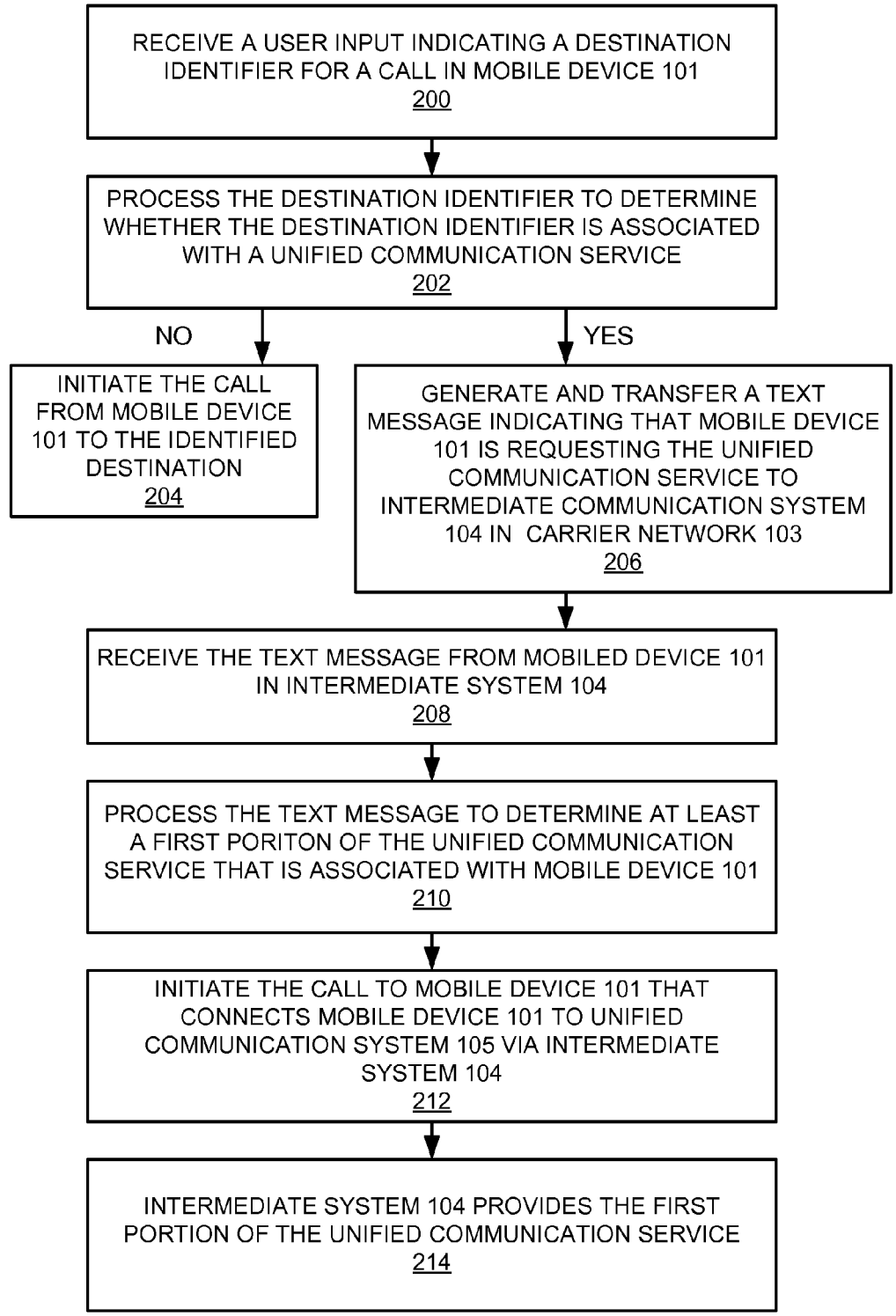
FIG. 2 illustrates the operation of a wireless communication system.

FIG. 2 illustrates the operation of wireless communication system 100. Mobile device 101 receives a user input indicating destination identifier for a call (step 200). The destination identifier may be a phone number, a Session Initiation Protocol (SIP) identifier, an IP address, or some other identifier that may be used to identify a call destination. A user may indicate the destination identifier in mobile device 101 by dialing a number, selecting the identifier out of a contact list, selecting the identifier off of a web page, selecting the identifier out of an email, or some other way that a user may select an identifier on a mobile device. The destination identifier may be for a standard voice call but may also be a VoIP call or a request for some other unified communication service such as voicemail or messaging.

Mobile device 101 processes the destination identifier to determine whether the destination identifier is associated with a unified communication service (step 202). The destination identifier is associated with the unified communication service if the destination identifier directs a call to the unified communication service. Mobile device 101 may process the destination identifier by using a lookup table or otherwise comparing the destination identifier to those identifiers that are associated with the unified communication service. A database of associated identifiers for comparison may be stored on mobile device 101. Alternatively, the database of associated identifiers may be stored elsewhere, such as on intermediate system 104 or unified communication system 105.

If the destination identifier is not associated with the unified communication service, then mobile device 101 initiates the call to the identified destination (step 204). If the destination identifier is associated with the unified communication system, then mobile device 101 generates and transfers a text message indicating that mobile device 101 is requesting the unified communication service to intermediate communication system 104 in carrier network 103 (step 206). The text message may be sent using short message service (SMS), multimedia messaging service (MMS), email, or some other service capable of sending text-based messages.

Intermediate communication system 104 receives the text message from mobile device 101 (step 208). Intermediate communication system 104 processes the text message to determine a first portion of the unified communication service that is associated with mobile device 101 (step 210). Intermediate communication system 104 may determine whether the first portion of the unified communication service is associated with mobile device 101 by identifying mobile device 101 and determining which portion of the unified communication service is associated with the destination identifier and mobile device 101. Mobile device 101 may be identified by the return number of mobile device 101, possibly located in a header of the text message, or by some other form of identification for mobile device 101 included in the text message or otherwise.

Intermediate communication system 104 then initiates the call to mobile device 101 that connects mobile device 101 to unified communication system 105 via intermediate system 104 (step 212). Intermediate communication system 104 provides the first portion of the unified communication service (214). Therefore, mobile device 101 has identified itself to intermediate communication system 104 as being associated with the requested unified communication service, which allows mobile device 101 to access the first portion of the unified communication service that is provided by intermediate communication system 104.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Carrier networks 102 and 103 and communication network 106 are communication networks that comprise telephony switches, wireless access nodes, Internet routers, network gateways, computer systems, communication links, or some other type of communication equipment—including combinations thereof.

Intermediate system 104 comprises a computer system and communication interface. Intermediate system 104 may also include other components such a router, server, data storage system, and power supply. Intermediate system 104 may reside in a single device or may be distributed across multiple devices. Intermediate system 104 is shown externally to carrier network 103, but intermediate system 104 could be integrated within the components of carrier network 103. Intermediate system 104 could be a mobile switching center, network gateway system, Internet access node, application server, IMS core, service node, or some other communication system—including combinations thereof. Intermediate system 104 may provide audio, video, VoIP, unified communication, or some other application or service that mobile device 101 could access over carrier network 103.

Unified communication system 105 comprises a computer system and communication interface. Unified communication system 105 may also include other components such a router, server, data storage system, and power supply. Unified communication system 105 may reside in a single device or may be distributed across multiple devices. Unified communication system 105 is shown externally to carrier network 103, but unified communication system 105 could be integrated within the components of carrier network 103. Unified communication system 105 could be a mobile switching center, network gateway system, Internet access node, application server, IMS core, service node, or some other communication system—including combinations thereof. Unified communication system 105 provides at least a portion of unified communication services that mobile device 101 could access over carrier networks 102 and 103.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-114 use metal, glass, air, space, or some other material as the transport media. Communication links 111-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-114 could be a direct link or may include intermediate networks, systems, or devices.

Figure 3:
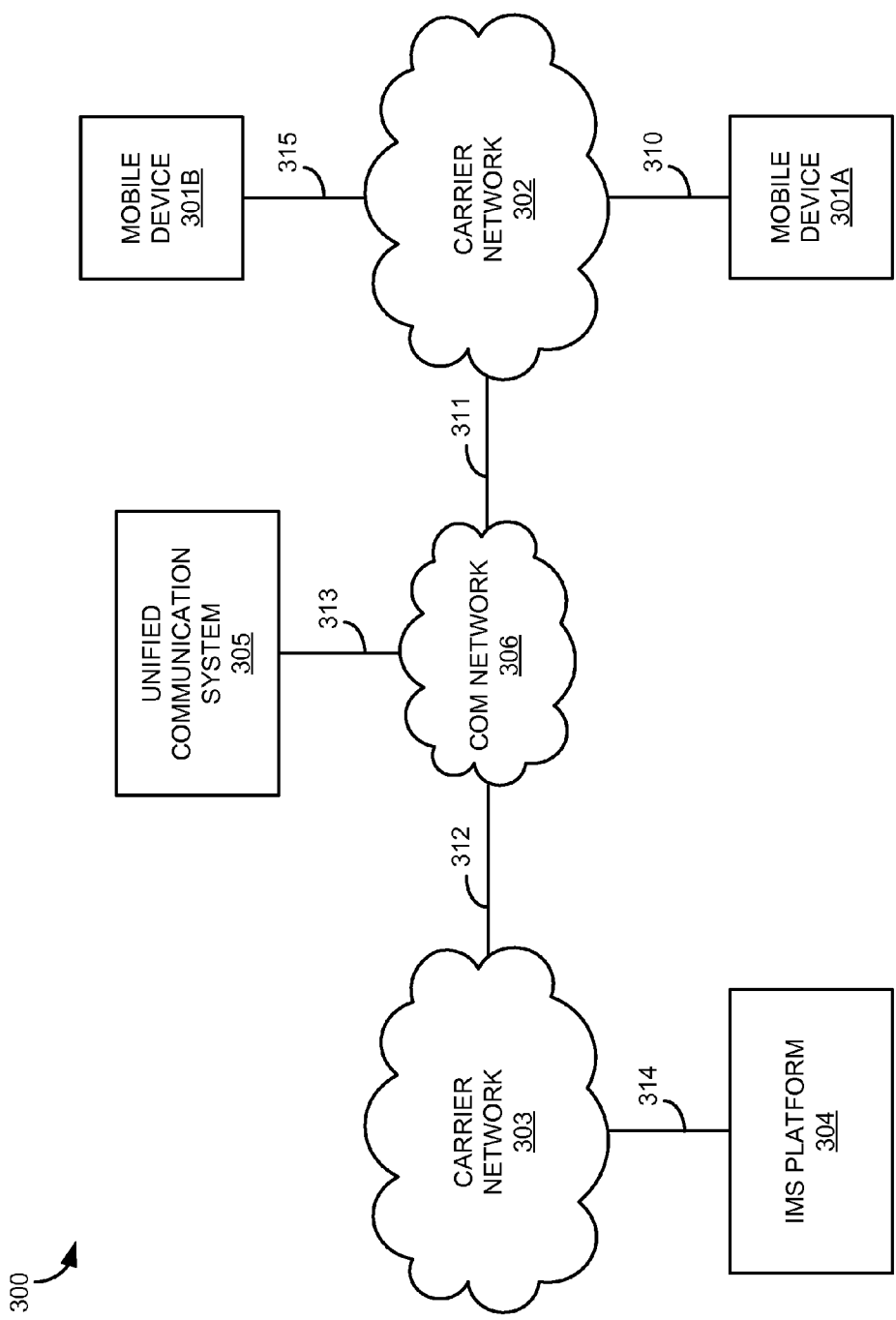
FIG. 3 illustrates a wireless communication system.

FIG. 3 illustrates wireless communication system 300 in an example embodiment. Wireless communication system 300 includes mobile device 301A, mobile device 301B, carrier network 302, carrier network 303, Internet Protocol Multimedia Subsystem (IMS) platform 304, unified communication system 305, and communication network 306. Mobile device 301A and carrier network 302 communicate over wireless link 310. Mobile device 301B and carrier network 302 communicate over wireless link 315. Carrier network 302 and communication network 306 communicate over link 311. Communication network 306 and carrier network 303 communicate over link 312. Communication network 306 and unified communication system 305 communicate over link 313. Carrier network 303 and IMS platform 304 communicate over link 314.

Wireless links 310 and 315 use the air or space as the transport media. Wireless links 310 and 315 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 311-314 use metal, glass, air, space, or some other material as the transport media. Communication links 311-314 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 311-314 could be a direct link or may include intermediate networks, systems, or devices.

Unified communication system 305 is shown external to carrier network 303 and communication network 306 but may be part of either network. Unified communication system 305 may be integrated into IMS platform 304.

IMS platform 304 provides a portion of unified communication services but may also provide other services for carrier network 303.

In FIG. 3 IMS platform 304 is located within carrier network 303 while mobile devices 301A and 301B are located on carrier network 302. Hence, if mobile devices 301A and 301B are associated with a unified communication service and access unified communication system 306 for the unified communications service, then mobile devices 301A and 301B will not be automatically routed through IMS platform 304 because carrier network 303 is not handling the call. Without accessing IMS platform 304, mobile devices 301A and 301B may not have access to at least a portion of the unified communication service.

Mobile devices 301A and 301B are associated with a unified communication service provided by IMS platform 304 and unified communication system 305. In order to receive the portion of the unified communication service that is provided by IMS platform 305, mobile devices 301A and 301B are configured to determine whether a user indicated destination identifier is associated with the unified communication services and transfer a text message to IMS platform 304. This functionality is described in further detail below in reference to FIGS. 4 and 5.

Figure 4:
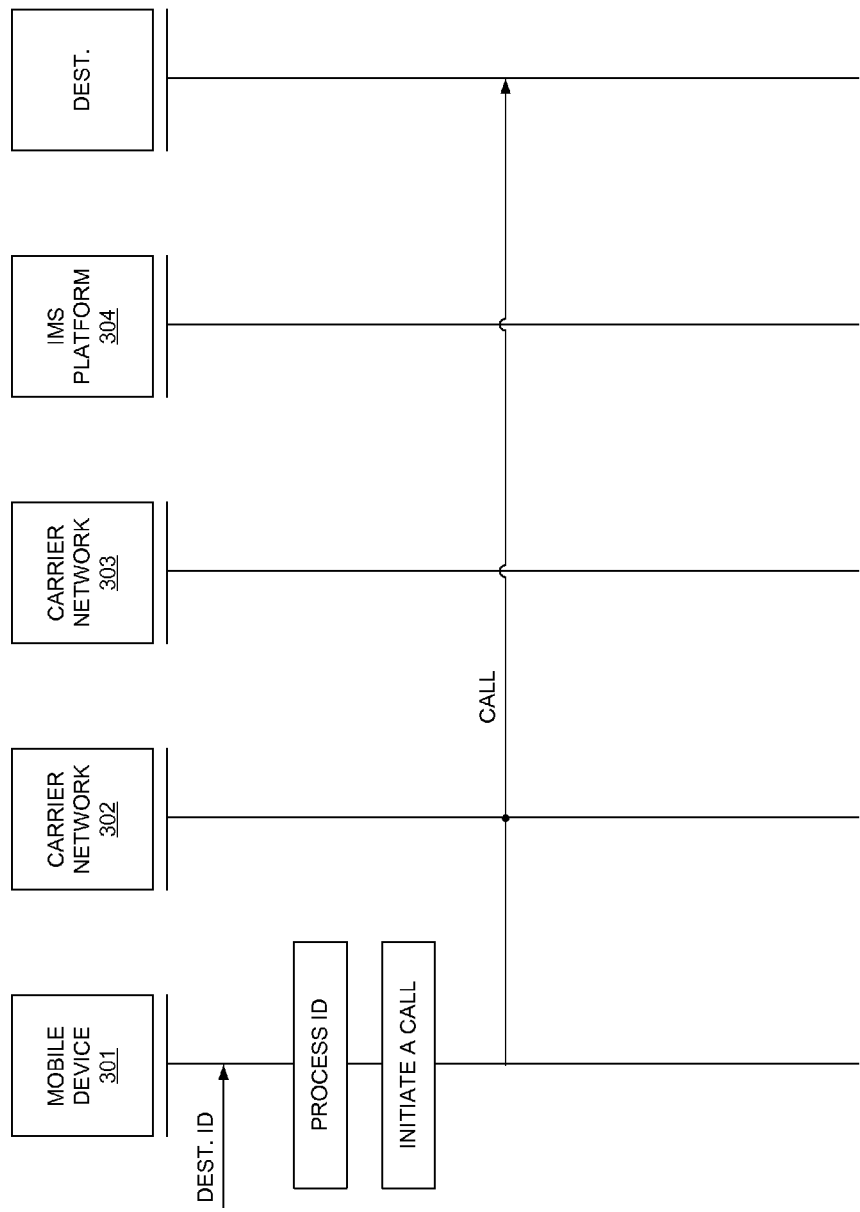
FIG. 4 illustrates the operation of a wireless communication system.

FIG. 4 is a sequence diagram illustrating the operation of communication network 300. Mobile device 301A begins by receiving a user input indicating a destination identifier for a call. The user input may be a user dialed number or a user selected identifier out of a contact list, website, email, or other type of user destination indication. In this example, the destination identifier indicated by the user is not associated with the unified communication service. Mobile device 301A processes the destination identifier to determine that the identifier is not associated with the unified communication service. Since the destination identifier is not associated with the unified communication service, mobile device 301A initiates the call to the indicated destination through carrier network 302. The indicated destination is not shown in FIG. 3 but may be a communication device or system located within carrier networks 302 or 303, communication network 306, or some other communication network.

Figure 5:
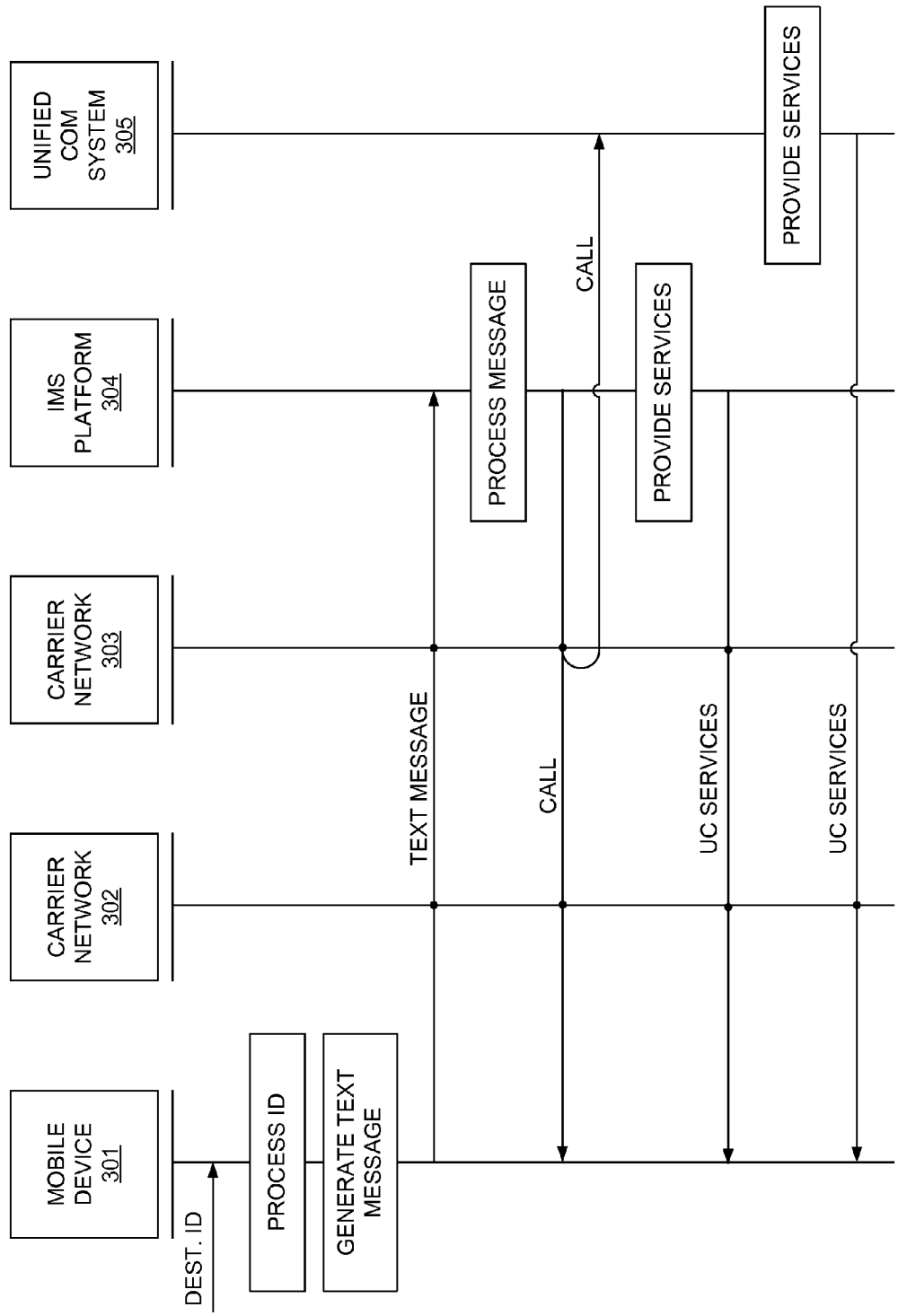
FIG. 5 illustrates the operation of a wireless communication system.

FIG. 5 is a sequence diagram illustrating the operation of communication network 300. Mobile device 301B begins by receiving a user input indicating a destination identifier for a call. The user input may be a user dialed number or a user selected identifier out of a contact list, website, email, or other type of user destination indication. In this example, the destination identifier indicated by the user is associated with the unified communication service. Mobile device 301B processes the destination identifier to determine that the identifier is associated with the unified communication service. Upon determining that the destination identifier is associated with the unified communication service, mobile device 301 may save the identifier in a list of associated identifiers for quick reference. Thus, if the user indicates the same identifier at a later time, mobile device 301 will only need to check whether the identifier is on the associated identifier list before having to fully process the identifier.

Mobile device 301B generates a text message indicating that mobile device 301B is requesting the unified communication service. The text message may indicate the phone number from the user and an identifier for mobile device 301B, or any other information necessary for mobile device 301B to access the unified communication service. Mobile device 301B then transfers the text message to IMS platform 304.

IMS platform 304 receives the text message from mobile device 301B and processes the message to determine a first portion of the unified communication service that is associated with mobile device 301B. IMS platform 304 determines a first portion of the unified communication service based on the unified communication service that is associated with the destination identifier and the unified communication service that is associated with mobile device 301B. Thus, the portion of the unified communication service that is provided by IMS platform 304 depends on whether the portion is needed for the requested unified communication service and whether mobile device 301B is allowed to access the portion of the unified communication service by being associated with the unified communication service.

After determining the first portion of the unified communication service that is associated with the destination identifier, IMS platform 304 initiates the call to mobile device 301B that connects mobile device 301B to unified communication system 305 via IMS platform 304. IMS platform provides the first portion of the unified communication service mobile device 301B while unified communication system 305 provides a second portion. Therefore, even though mobile device 301B is not accessing the unified communication service from within carrier network 303, mobile device 301B can still access the portion of the unified communication service that is provided by IMS platform 304.

In both FIGS. 4 and 5, mobile device 301 may be preconfigured to process the user indicated destination identifier. However, mobile device 301 may also install and run an application that processes the destination identifier, generates the text message, and transfers it to IMS platform 304. The application may run in the background and automatically process user indicated destination identifier or the application may be executed by the user for the purpose of indicating a destination identifier. The application may be provided by the unified communication service.

Additionally, the application may be a text message application supplied with mobile device 301 or otherwise installed on mobile device 301. A user may input the unified communication service information or destination identifier into a text message field in the application and send the text message to IMS platform 304 without mobile device 301 performing those steps automatically.

In some embodiments, unified communication system 305 provides a second portion of the unified communication service to mobile device 301. In those embodiments, mobile device 301 is provided with both the first portion of the unified communication service that is provided by intermediate system 304 and the second portion of the unified communication service that is provided by unified communication system 305. Thus, mobile device 301 is provided with both portions of the unified communication service even though mobile device 301 is located on carrier network 302 instead of carrier network 303.

In other embodiments, before transferring the text message to IMS platform 304, mobile device 301 determine whether the mobile device is operating within carrier network 303. If mobile device is operating within carrier network 303, then mobile device 301 is operating on the same carrier network as IMS platform 304. Therefore, mobile device 301 connects the call to unified communication system 305 because the call will be routed through IMS platform 304 automatically.

Figure 6:
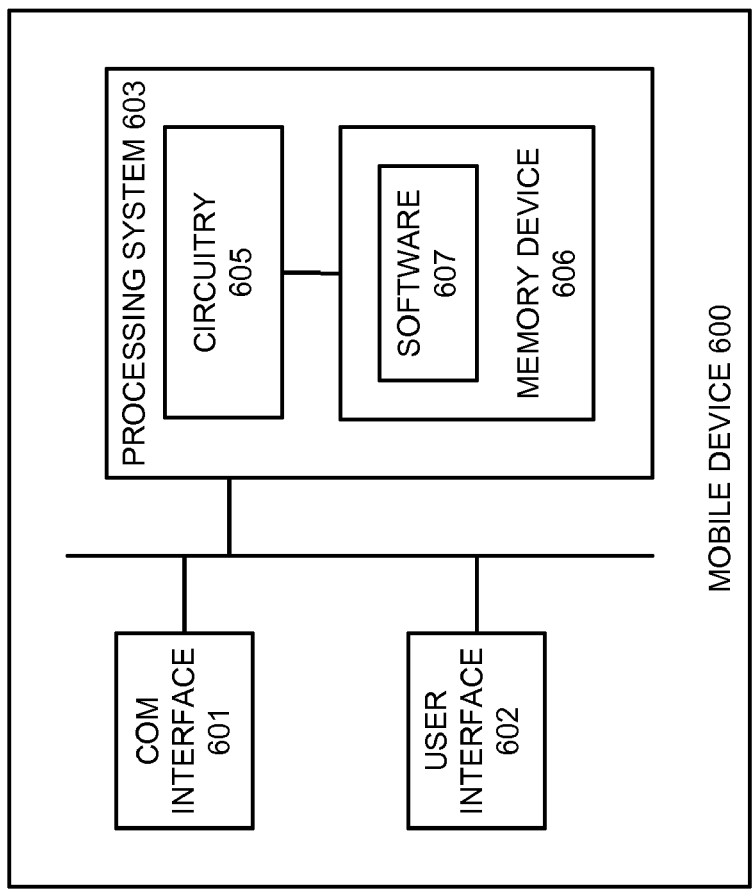
FIG. 6 illustrates a mobile communication device.

FIG. 6 illustrates mobile device 600. Mobile device 600 is an example of mobile devices 101, 301A, and 301B, although mobile devices 101, 301A, and 301B use alternative configurations. Mobile device 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, touch screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate communication mobile device 600 as described herein.

In particular, user interface 602 receives a user input indicating a destination identifier for a call. Processing system 603 processes the destination identifier to determine whether the destination identifier is associated with a unified communication service. If the destination identifier is not associated with the unified communication service, processing system 603 initiates the call to the identified destination using communication interface 601. If the destination identifier is associated with the unified communication service, processing system 603 generates a text message indicating that the mobile device is requesting the unified communication service and transfers the text message to an intermediate communication system in a first carrier network using communication interface 601. Communication interface 601 further receives a call from the intermediate communication system in order to access the unified communication service.

Figure 7:
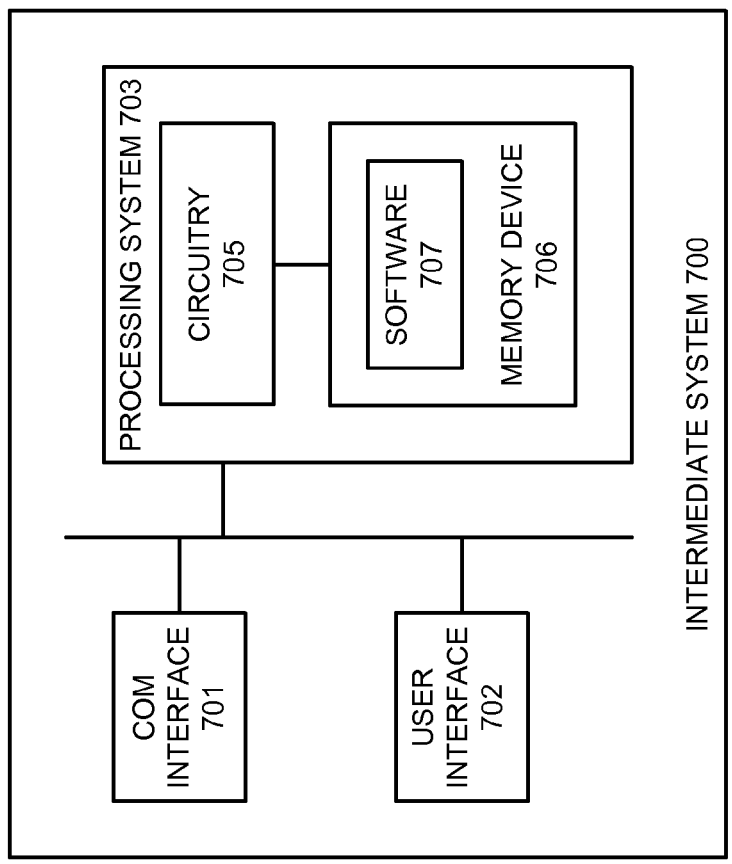
FIG. 7 illustrates an intermediate communication system.

FIG. 7 illustrates intermediate communication system 700. Intermediate system 700 is an example of intermediate system 104 and IMS platform 304, although intermediate system 104 and IMS platform 304 may use alternative configurations. Intermediate system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links.

Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, touch screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate intermediate communication system 700 as described herein.

In particular, communication interface 701 receives a text message indicating that a mobile device is requesting a unified communication service. Processing system 703 processes the test message to determine at least a first portion of the unified communication service that is associated with the mobile device. Processing system 703 initiates a call to the mobile device using communication interface 701. The call connects the mobile device to a unified communication system via intermediate communication system 700. Processing system 703 provides the first portion of the unified communication service to the mobile device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system comprising:
   a mobile device configured to:
      receive a user input indicating a destination identifier for a call;
      process the destination identifier to determine whether the destination identifier is associated with a unified communication service;
      if the destination identifier is not associated with the unified communication service, initiate the call to the identified destination;
      if the destination identifier is associated with the unified communication service, generate a text message indicating that the mobile device is requesting the unified communication service and transfer the text message to an intermediate communication system in a first carrier network;
   the intermediate communication system configured to:
      receive the text message from the mobile device;
      process the text message to determine at least a first portion of the unified communication service that is associated with the mobile device;
      initiate the call to the mobile device that connects the mobile device to a unified communication system via the intermediate communication system;
      provide the first portion of the unified communication service.

2. The communication system of claim 1 wherein the mobile device is further configured to:
   if the destination identifier is associated with the unified communication service, determine whether the mobile device is in the first carrier network;
   if the mobile device is in the first carrier network, connect the call to the unified communication system.

3. The communication system of claim 1 further comprising the unified communication system configured to provide a second portion of the unified communication service.

4. The communication system of claim 1 wherein the destination identifier is received in an application running on the mobile device.

5. The communication system of claim 2 wherein the application is a text messaging application.

6. The communication system of claim 1 wherein destination identifier is received and processed by an application running in the background on the mobile device.

7. The communication system of claim 1 wherein the unified communication system is integrated into the intermediate communication system.

8. The communication system of claim 3 wherein at least one of the first and second portions of the unified communication service comprises real time voice communication services.

9. The communication system of claim 3 wherein at least one of the first and second portions of the unified communication service comprises unified messaging services.

10. A method of operating a communication system comprising:
    in a mobile device:
       receiving a user input indicating a destination identifier for a call;
       processing the destination identifier to determine whether the destination identifier is associated with a unified communication service;
       if the destination identifier is not associated with the unified communication service, initiating the call to the identified destination;
       if the destination identifier is associated with the unified communication service, generating a text message indicating that the mobile device is requesting the unified communication service to an intermediate communication system in a first carrier network;
    in the intermediate communication system:
       receiving the text message from the mobile device;
       processing the text message to determine at least a first portion of the unified communication service that is associated with the mobile device;
       initiating the call to the mobile device that connects the mobile device to a unified communication system via the intermediate communication system;
       providing the first portion of the unified communication service;
    in the unified communication system, providing a second portion of the unified communication service.

11. The method of claim 10 further comprising:
    in the mobile device, if the destination identifier is associated with the unified communication service, determining whether the mobile device is in the first carrier network;
    if the mobile device is in the first carrier network, connecting the call to the unified communication system.

12. The method of claim 10 further comprising, in the unified communication system, providing a second portion of the unified communication service.

13. The method of claim 9 wherein the destination identifier is received in an application running on the mobile device.

14. The method of claim 10 wherein the application is a text messaging application.

15. The method of claim 9 wherein the destination identifier is received and processed by an application running in the background on the mobile device.

16. The method of claim 9 wherein the unified communication system is integrated into the intermediate communication system.

17. The method of claim 12 wherein at least one of the first and second portions of the unified communication service comprises real time voice communication services.

18. The method of claim 12 wherein at least one of the first and second portions of the unified communication service comprises unified messaging services.

19. A mobile device comprising:
    a user interface configured to receive a user input indicating a destination identifier for a call;
    a processing system configured to:
       process the destination identifier to determine whether the destination identifier is associated with a unified communication service;
       if the destination identifier is not associated with the unified communication service, initiate the call to the identified destination;
       if the destination identifier is associated with the unified communication service, generate a text message indicating that the mobile device is requesting the unified communication service to an intermediate communication system in a first carrier network;

a communication interface configured to:

transfer the text message to the intermediate communication system;

receive the call from the intermediate communication system that connects the mobile device to a unified communication system via the intermediate communication system wherein the intermediate communication system provides a first portion of the unified communication service and the unified communication system provides a second portion of the unified communication service.

20. The mobile device of claim 19 wherein processing system is further configured to:

if the destination identifier is associated with the unified communication service, determine whether the mobile device is in the first carrier network;

if the mobile device is in the first carrier network, connect the call to the unified communication system.

* * * * *